United States Patent
Yen et al.

(10) Patent No.: US 9,541,947 B2
(45) Date of Patent: Jan. 10, 2017

(54) TIME PROTOCOL BASED TIMING SYSTEM FOR TIME-OF-FLIGHT INSTRUMENTS

(71) Applicant: General Electric Company, Schenectady, NY (US)

(72) Inventors: Yichin Yen, Hickley, OH (US); Fred YuFeng Chou, Stow, OH (US); Michael Barry DeLong, Macedonia, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 675 days.

(21) Appl. No.: 13/960,832

(22) Filed: Aug. 7, 2013

(65) Prior Publication Data

US 2015/0046741 A1    Feb. 12, 2015

(51) Int. Cl.
*G06F 17/30* (2006.01)
*G06F 1/12* (2006.01)
(Continued)

(52) U.S. Cl.
CPC .............. *G06F 1/12* (2013.01); *G04F 10/00* (2013.01); *G04G 7/00* (2013.01); *G06F 1/14* (2013.01);
(Continued)

(58) Field of Classification Search
CPC ...... G04F 10/00; G04G 7/00; G06F 17/30312; G06F 1/12; G06F 1/14; H04J 3/065; H04J 3/0661
See application file for complete search history.

(56) References Cited

U.S. PATENT DOCUMENTS 7,471,980 B2 * 12/2008 Koshiol ............. A61N 1/37252
                                                                    607/9
8,095,615 B2    1/2012 Briscoe et al.
(Continued)

FOREIGN PATENT DOCUMENTS

EP    0840185 A1    5/1998
FR    2937817 A1    4/2010

OTHER PUBLICATIONS

Loschmidt et al., "White rabbit—sensor/actuator protocol for the CERN LHC particle accelerator", Sensors, pp. 781-786, Oct. 25, 2009.
(Continued)

*Primary Examiner* — M Elamin
(74) *Attorney, Agent, or Firm* — Cooper Legal Group, LLC (57) ABSTRACT

Presented herein are systems, methods, and computer-readable media for recording event times in particle detection scenarios. The systems, methods, and computer-readable media involve the identification of one facility device as a grandmaster clock among at least two facility devices of a facility device set, where the respective facility devices are selected from a facility device type set including a beam monitor; a neutron instrument; a neutron chopper; a nuclear reactor; a particle accelerator; a network router; and a user workstation. The system, method, and computer-readable medium also involve configuring the facility devices to synchronize a clock component with the grandmaster clock; and, upon detecting an event, retrieve from the clock component of the selected facility device an absolute event timestamp that is independent of event times of other events, and store a record of the facility event and the absolute event timestamp in the data store.

20 Claims, 6 Drawing Sheets

(51) Int. Cl.
*G04F 10/00* (2006.01)
*G04G 7/00* (2006.01)
*H04J 3/06* (2006.01)
*G06F 1/14* (2006.01)

(52) U.S. Cl.
CPC ......... *G06F 17/30312* (2013.01); *H04J 3/065* (2013.01); *H04J 3/0661* (2013.01)

(56) References Cited

U.S. PATENT DOCUMENTS

| | | | |
|---|---|---|---|
| 8,320,412 B2 | 11/2012 | Li | |
| 8,365,005 B2 * | 1/2013 | Bengtson | G05B 15/02 |
| | | | 702/1 |
| 8,744,242 B2 * | 6/2014 | Braun | G11B 27/034 |
| | | | 386/280 |
| 8,930,579 B2 * | 1/2015 | Pleasant | H04J 3/0664 |
| | | | 709/218 |
| 2005/0137627 A1 * | 6/2005 | Koshiol | A61N 1/37252 |
| | | | 607/4 |
| 2012/0153166 A1 | 6/2012 | Gueorguiev et al. | |
| 2012/0324520 A1 * | 12/2012 | Van Deventer | H04L 65/605 |
| | | | 725/109 |
| 2015/0056981 A1 * | 2/2015 | Song | H04W 24/04 |
| | | | 455/423 |

OTHER PUBLICATIONS

International Search Report and Written Opinion issued in connection with corresponding PCT Application No. PCT/US2014/048804 dated Aug. 7, 2015.

* cited by examiner

TIME PROTOCOL BASED TIMING SYSTEM FOR TIME-OF-FLIGHT INSTRUMENTS

BACKGROUND OF THE INVENTION

Field of the Invention

The present disclosure is related to the tracking of events within the field of particle detection.

Discussion of the Prior Art

In a particle detector facility, devices may be configured to detect events such as the detection of particles and particle collisions within a collider. The devices may also be configured to interoperate with other devices to identify, with high precision, the occurrence time of the events. Many such facilities are configured to record the time of such events in a relative manner. For example, a periodic clock signal may be broadcast throughout the facility over a proprietary network. Respective devices may include a clock component that identifies the amount of time elapsed since the latest periodic clock signal, and, upon detecting an event, may retrieve and record the offset from the latest clock signal. The absolute time, sequence, and/or duration of the respective events may later be calculated by adding the time of the clock signal and the offset recorded for the event.

BRIEF DESCRIPTION OF THE INVENTION

The following presents a simplified summary of the invention in order to provide a basic understanding of some example embodiments of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one embodiment, the present invention provides a system for configuring a particle detector facility to record event times. In one such embodiment, this system includes a grandmaster clock designating component, which includes instructions that, when executed on a processor of a device, causes the device to, among at least two facility devices of a facility device set of the particle detector facility, the respective facility devices selected from a facility device type set including a beam monitor facility device, a neutron instrument facility device, a neutron chopper facility device, a nuclear reactor facility device, a particle accelerator facility device, a network router facility device, and a user workstation facility device, identify one facility device as a grandmaster clock. This system also includes a clock synchronizing component, which includes instructions that, when executed on a processor of a selected facility device further including a clock component and a data store, cause the selected facility device to synchronize the clock component with the grandmaster clock; and upon detecting an event, retrieve from the clock component of the selected facility device an absolute event timestamp that is independent of event times of other events, and store the event and the absolute event timestamp in the data store.

In accordance with another embodiment, the present invention provides a method of configuring a particle detector facility to record event times. In one such embodiment, the method includes, among at least two facility devices of a facility device set of the particle detector facility, the respective facility devices selected from a facility device type set including a beam monitor facility device, a neutron instrument facility device, a neutron chopper facility device, a nuclear reactor facility device, a particle accelerator facility device, a network router facility device, and a user workstation facility device, identifying one facility device as a grandmaster clock; and for respective selected facility devices that include a clock component and a data store, configuring the selected facility device to synchronize the clock component with the grandmaster clock; and, upon detecting an event, retrieve from the clock component of the selected facility device an absolute event timestamp that is independent of event times of other events; and store the event and the absolute event timestamp in the data store.

In accordance with yet another embodiment, the present invention provides a computer-readable storage medium storing instructions that enable the facility devices of a particle detector facility to record event times. In one such embodiment, the computer-readable medium stores instructions that, when executed on a process of respective at least two facility devices of a facility device set of the particle detector facility, the respective facility devices selected from a facility device type set including a beam monitor facility device, a neutron instrument facility device, a neutron chopper facility device, a nuclear reactor facility device, a particle accelerator facility device, a network router facility device, and a user workstation facility device, cause the respective facility devices to identify one facility device as a grandmaster clock. The computer-readable medium also includes instructions that, when executed on the processor of respective facility devices having a data store, cause the facility device to synchronize the clock component with the grandmaster clock; and, upon detecting an event, retrieve from the clock component of the selected facility device an absolute event timestamp that is independent of event times of other events; and store the event and the absolute event timestamp in the data store.

To the accomplishment of the foregoing and related ends, the following description and annexed drawings set forth illustrations of certain aspects and embodiments. These are indicative of but a few of the various ways of embodying one or more aspects of the presented techniques. Other aspects, advantages, and embodiments of the present invention will become apparent from the following detailed description when considered in conjunction with the annexed drawings.

BRIEF DESCRIPTION OF THE DRAWINGS

The foregoing discussion of the present invention will become apparent to those skilled in the art to which the present invention relates upon reading the following description with reference to the accompanying drawings, in which.

DETAILED DESCRIPTION OF THE INVENTION

A. Introduction

Within the field of physics, many types of particle facilities are constructed and maintained to initiate, detect, monitor, and record the occurrence of one or more events relevant to the study of particle physics through the use of a set of facility devices. For example, the facility devices of the particle detector facility may include a beam monitor device that generates and maintains an ion beam; a neutron chopper configured to generate a well-defined source of neutrons; a nuclear reactor configured to generate neutrons; a particle accelerator that propels the neutrons and other subatomic particles along the ion beam; and a neutron instrument that detects energy emissions indicating the presence and/or collisions of the neutrons within the ion beam. Facility researchers may utilize these components, as well as a set of computers (e.g., servers, workstations, and portable computing devices) to control the facility devices perform various calculations on the data captured by various detectors positioned within the particle detector facility. The interoperation of the facility devices generates a precisely controlled environment for controlling and investigating a set of particles and the interactions thereamong.

Figure 1:
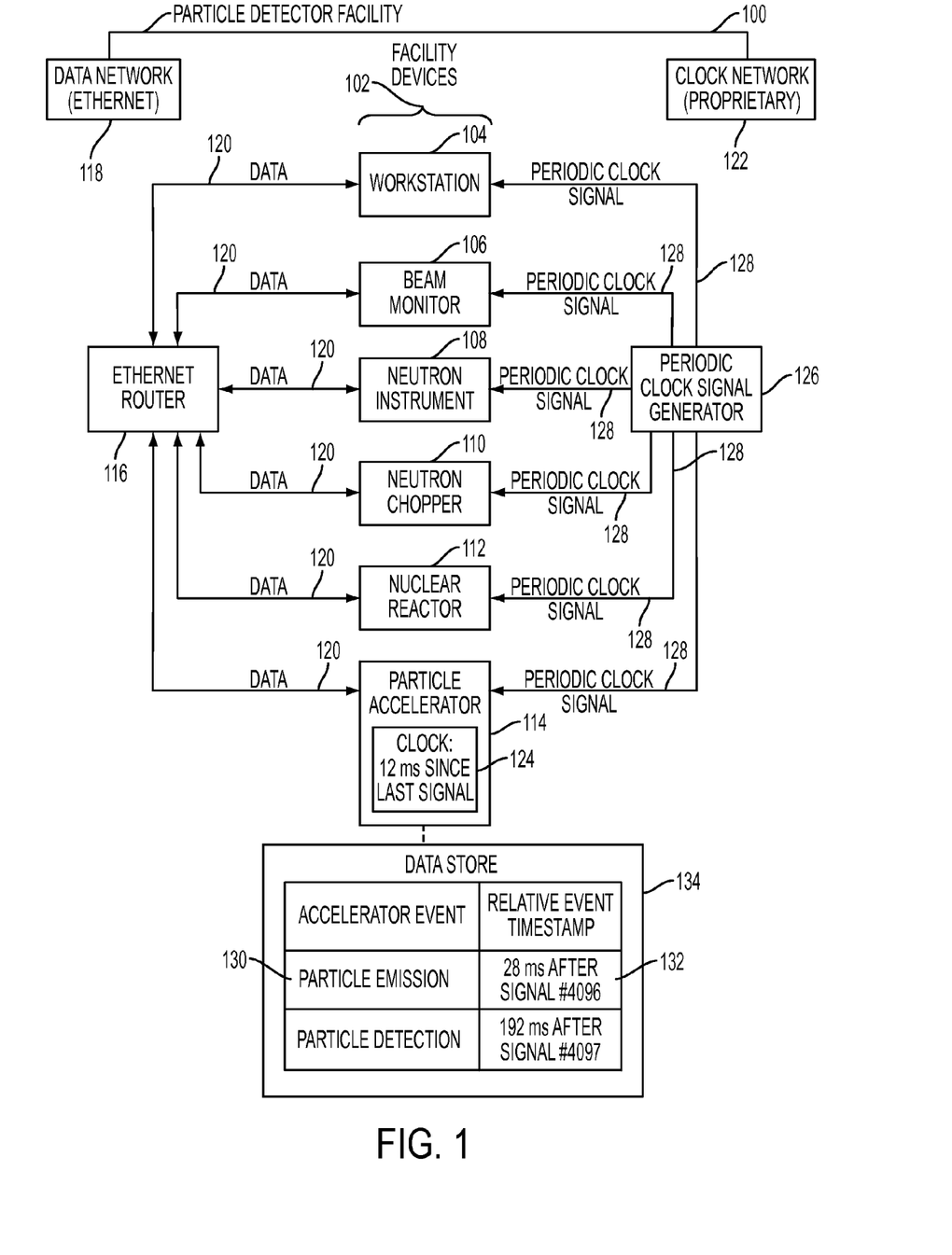
FIG. 1 is a schematic illustration of an example particle detector facility that includes an example set of particle detector facility devices respectively configured to synchronize a set of clock components over a proprietary clock network for relative event time recording.

FIG. 1 is an illustration of a particle detector facility 100 including an exemplary set of facility devices 102, including a workstation 104; a beam monitor 106; a neutron instrument 108; a neutron chopper 110; a nuclear reactor 112; and a particle accelerator 114. The facility devices 102 are connected via a data network 118 that exchanges data 120 among the facility devices 102 according to a network protocol, such as an Ethernet data network. Additionally, respective facility devices 102 are connected via a dedicated clock network 122, wherein a periodic clock signal generator 126 broadcasts a periodic clock signal 128. Respective facility devices 102 may be precisely calibrated to receive and to synchronize various facility events 130 with the periodic clock signal 128.

As a first example, the neutron chopper 110 may emit neutrons promptly upon receiving a periodic clock signal 128, thus providing a fixed emission time of the particles entering the ion beam. As a second example, the accelerator may include a clock component 124, and may synchronize the time of the clock component 124 to identify an elapsed duration since the last detected periodic clock signal 128. The particle accelerator 114 may also record, in a data store 134, a set of accelerator facility events 130 of interest (e.g., the emission and/or detection of particles or collisions thereamong) according to a relative event timestamp 132, such as the number of microseconds between a particular periodic clock signal 128 and the detection of the facility event 130. In order to reconstruct the timing of the facility events 130, the relative event timestamps 132 of the facility events 130 may be compared with the times of the periodic clock signals 128, as well as other mitigating factors, such as the latency of the clock network 122 between the periodic clock signal generator 126 and the facility device 102. This recordation technique enables a rapid recording of event timestamps with comparatively high precision that is not diminished by the properties of the data network 118, which may exhibit a higher degree of variance, such as throughput and latency, that might otherwise impair the precise synchronization of the facility devices 102 with the periodic clock signal generator 126.

However, the example scenario illustrated by FIG. 1 may also present some disadvantages. As a first example, the implementation of a dedicated clock network 122 involves a significant cost of equipment and maintenance, such as the separate calibration and determination of the latency of the clock network 122, and the inclusion in various facility devices 102 of additional hardware (e.g., a clock signal interface operating alongside a data network interface, such as an Ethernet network adapter).

As a second example, in many such scenarios, the clock network 122 is implemented using a set of proprietary hardware and software protocols, which may be more costly and/or less widely supported than generalized hardware and software components.

As a third example, in many such scenarios, the confidence of the event recordation may be compromised by the relative event timestamp 132 model; e.g., miscalibration between a facility device 102 and the periodic clock signal generator 126, such as an incorrect latency determination, may alter the calculation of the absolute timestamp from the relative event timestamp 132.

As a fourth example, in many such scenarios, the precision achievable by the clock network 122 may be on the order of one microsecond, but it may be desirable to determine an even more precise range for the timing of the facility events 130 arising within the particle detector facility 100, such as the sub-microsecond range. These and other disadvantages may arise from the configuration of a particle detector facility 100 to record the times of detected facility events 130 in a relative manner according to a periodic clock network 122 as illustrated in the example scenario of FIG. 1.

B. Presented Techniques

Figure 2:
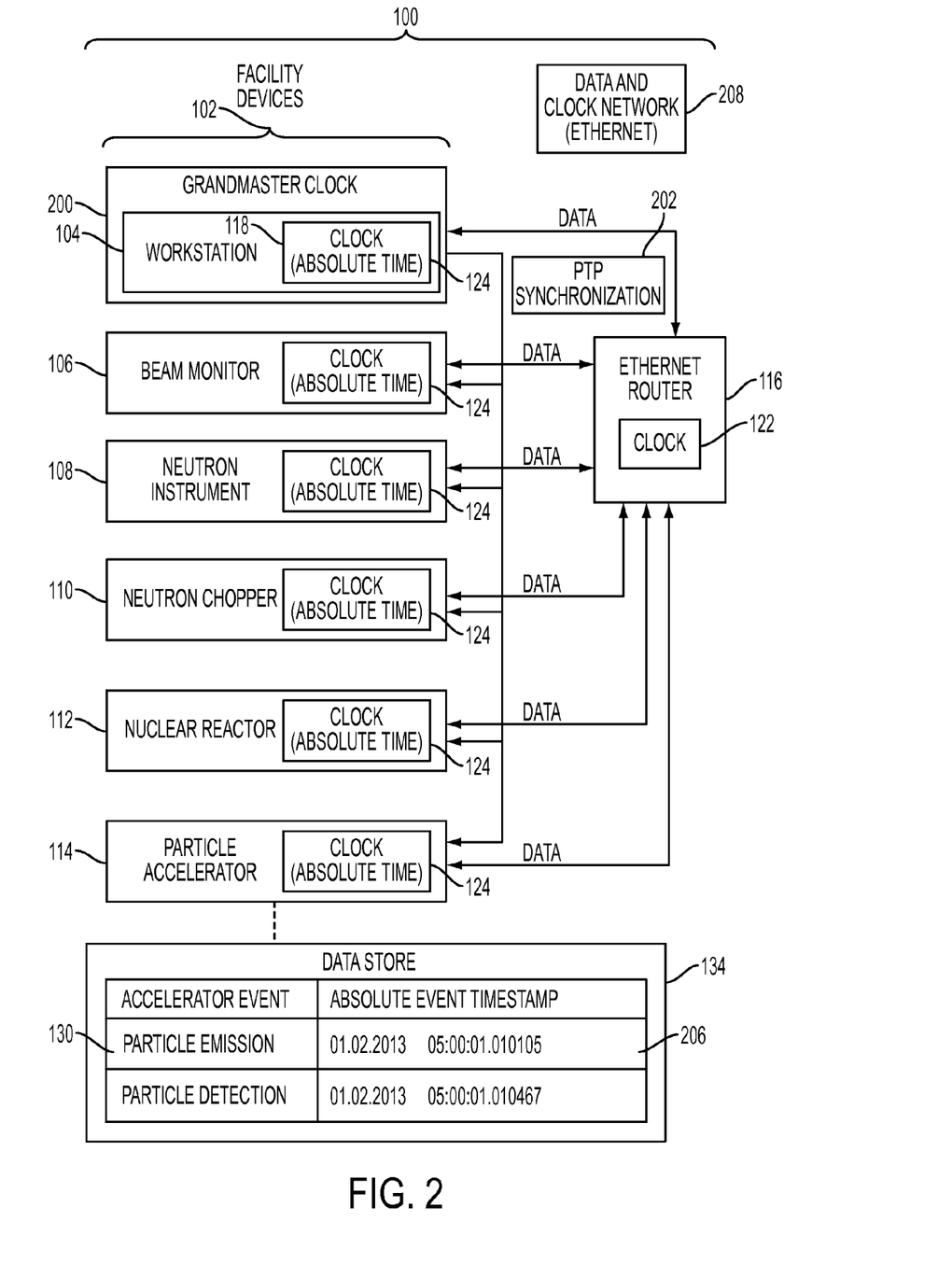
FIG. 2 is a schematic illustration of an example set of particle detector facility devices configured to synchronize a set of clock components over a data network for absolute event time recording in accordance with at least one embodiment of the present invention.

FIG. 2 presents an illustration of an example set of facility devices 102 in a particle detector facility 100 to detect and record the times of facility events 130 arising within a particle detector facility 100 in accordance with the techniques presented herein. In this example scenario, respective facility devices 102 are connected to a network 208 providing both data exchange and clock synchronization, such as an Ethernet network interconnecting the facility devices 102 through Ethernet cabling. Respective facility devices 102 include a clock component 124 that, upon request, provides an absolute event timestamp 206 of an absolute current time 204.

Among the respective facility devices 102, one facility device 102 is identified (e.g., by an administrator or an automated consensus selection) as a grandmaster clock 200. For example, the grandmaster clock 200 may be configured to synchronize its clock component 124 with an outside source having a high precision, such as a national time standards device, or may use a highly precise clock, such as an atomic clock. The respective other facility devices 102 synchronize the absolute time of the clock component 124 with the absolute time of the grandmaster clock 200 on a periodic basis (e.g., at a synchronization frequency of 64 Hz). This synchronization may be achieved in a reliable manner using the data and clock network 208, such as according to a variant of the Precision Time Protocol (PTP) synchronization technique 202. One such variant is the IEEE 1588-2008 (PTP version 2) protocol, entitled "Standard for a Precision Clock Protocol for Networked Measurement and Control Systems." Upon detecting an event, a facility device 102 retrieves an absolute event timestamp 206 of the facility event 130, and stores a record of the facility event 130 and the absolute event timestamp 206 in a data store 134 (e.g., a local hard disk drive, a solid-state memory device, or a network storage device).

Also presented herein is a method of configuring a particle detector facility 100 to record event times of facility events 130. The method includes, among at least two facility devices 102 of a facility device set of the particle detector facility 100, where the respective facility devices 102 are selected from a particle device type set including a user workstation facility device 104, a beam monitor facility device 106, a neutron instrument device 108, a neutron chopper facility device 110, a nuclear reactor facility device, a particle accelerator facility device 114, a network router facility device 116, identifying one facility device 102 as a grandmaster clock 200; and for respective selected facility devices 102 that include a clock component 124 and a data store 134, configuring the selected facility device 102 to synchronize the clock component 124 with the grandmaster clock 200; and, upon detecting a facility event 130, retrieving from the clock component 124 of the selected facility device 102 an absolute event timestamp 206 that is independent of event times of other events; and storing a record of the facility event 130 and the absolute event timestamp 206 in the data store 134.

This recordation technique illustrated in the example scenario of FIG. 2 enables the recording of event times of facility events 130 arising within the particle detector facility 100 in a manner that may present various advantages. As a first example, the use of the data network 118 to synchronize the clock components 124 of the facility devices 102 as well as to exchange data may reduce the amount of deployed hardware and software and the maintenance thereof.

As a second example, the use of the data network 118 for clock synchronization may utilize standardized networking and time synchronization protocols, such as Ethernet and a variant of the Precision Time Protocol techniques 202, which may provide reduced cost and broader support than proprietary networking and time synchronization components.

As a third example, the recordation of event times of facility events 130 according to an absolute event timestamp 206 may reduce the amount of calculation in determining event timing as compared with relative event timestamps 132, and/or may enable a higher degree of precision within the sub-microsecond range, such as a 50-nanosecond precision of time recording. These and other advantages may be achievable through the recordation of event times by the facility devices 102 including a particle detector facility 100 in accordance with the techniques presented herein.

C. Example Embodiments

Figure 3:
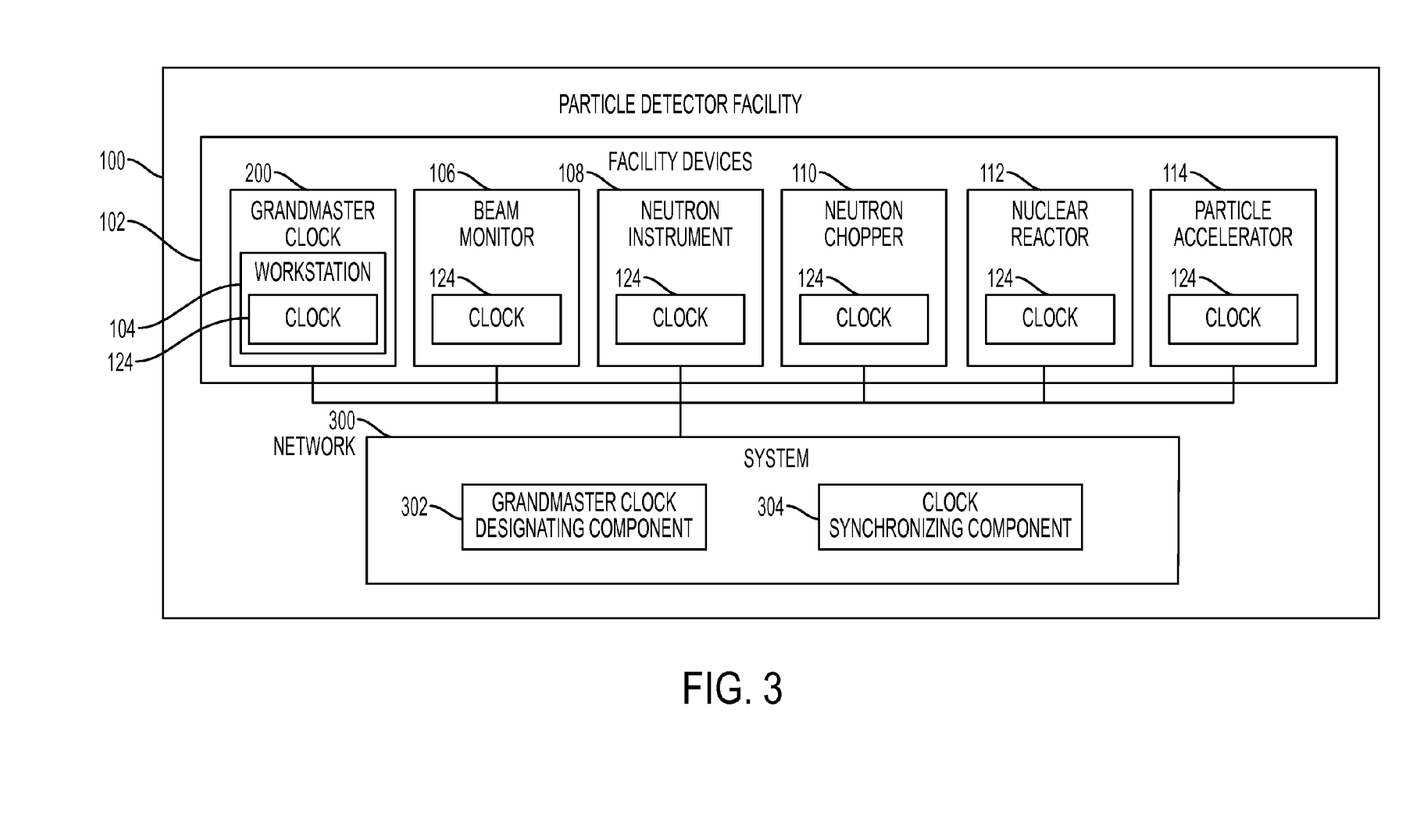
FIG. 3 is a schematic illustration of an example system for configuring a set of particle detector facility devices to synchronize a set of clock components over a data network for absolute event time recording in accordance with at least one embodiment of the present invention.

FIG. 3 is an illustration of an example scenario featuring one embodiment of a system for recording event times within a particle detector facility 100. In this example scenario, a particle detector facility 100 includes a set of facility devices 102, including a workstation facility device 104; a beam monitor facility device 106; a neutron instrument device 108; a neutron chopper facility device 110; a nuclear reactor facility device; a particle accelerator facility device 114; and a network router facility device 116. Respective facility devices 102 also include a clock component 124 that, upon request, provides an absolute event timestamp 206 of the current time. The facility devices 102 are interconnected (e.g., via a network router facility device 116) to exchange data over a data network 118, such as an Ethernet network.

In accordance with an embodiment of the present invention, the particle detector facility 100 also includes a system 300 for configuring the particle detector facility 100 to record event times of facility events 130 arising therewithin. The system 300 may be implemented, e.g., as a software application executing on a server, workstation, or other computing device. The system 300 includes a grandmaster clock designating component 302, including instructions that, when executed on a processor of a device, cause the device to, among at least two facility devices 102 of the particle detector facility 100, identify one facility device 102 as a grandmaster clock 200. The system 300 also includes a clock synchronizing component 304 including instructions that, when executed on a processor of a selected facility device 102 further including a clock component 124, cause the selected facility device 102 to synchronize the clock component 124 with the grandmaster clock 200; and, upon detecting a facility event 130, retrieve from the clock component 124 of the selected facility device 102 an absolute event timestamp 206 that is independent of event times of other events, and store a record of the facility event 130 and the absolute event timestamp 206 in the data store 134. By achieving the technical effect of recording the times of the facility events 130 detected within the particle detector facility 100 according to an absolute event timestamp 206 retrieved from a clock component 124 that has previously been synchronized with a grandmaster clock 200 over the data network 118, the example system 300 causes the facility devices 102 of the particle detector facility 100 to operate in accordance with the present invention.

Figure 4:
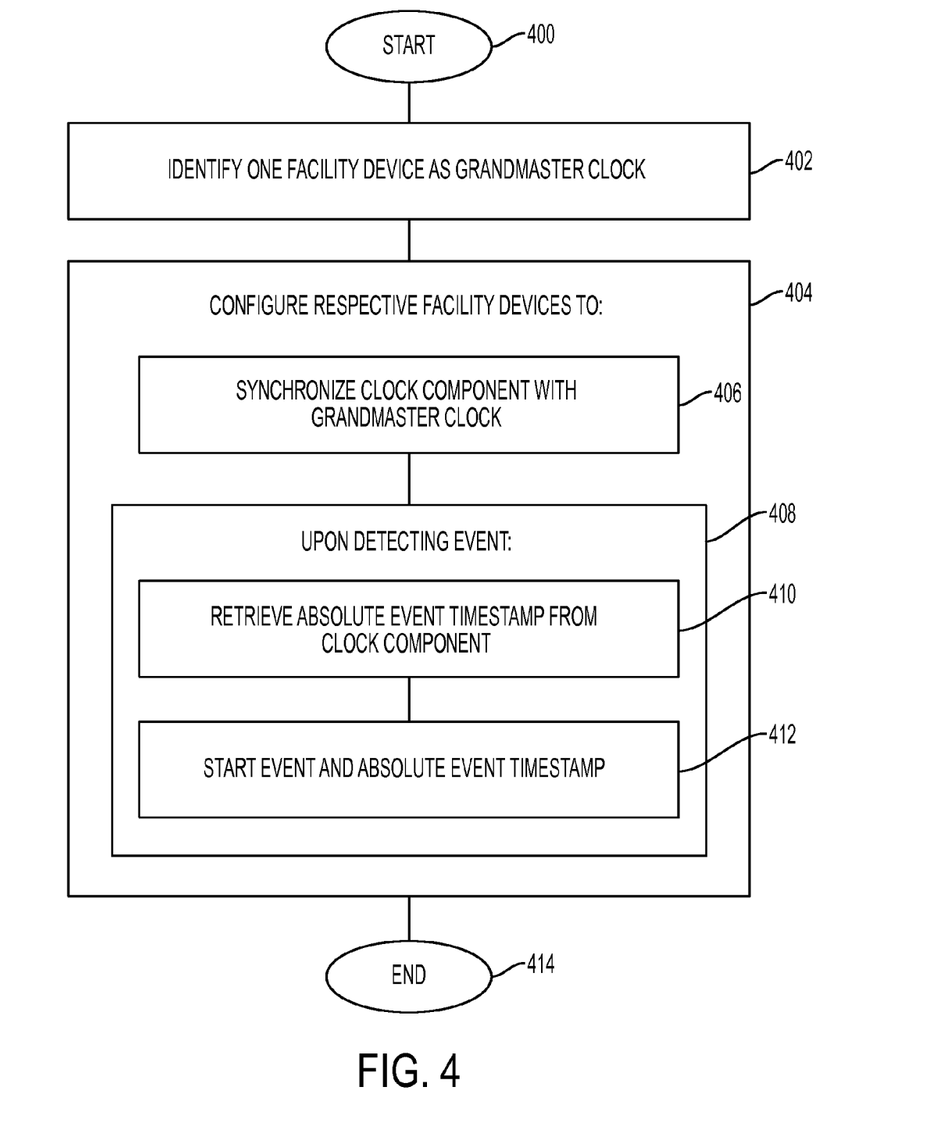
FIG. 4 is top-level flowchart of an example method of configuring a set of particle detector facility devices to synchronize a set of clock components over a data network for absolute event time recording in accordance with at least one embodiment of the present invention.

FIG. 4 is an illustration of a flow diagram illustrating one embodiment of a method of configuring a particle detector facility 100 to record event times in accordance with the present invention. The example method may be implemented, e.g., as instructions executing on a processor of one or more facility devices 102; as a circuit configured to cause one or more facility devices 102 to operate according to the techniques presented herein; or as a combination thereof. The example method may be utilized within a particle detector facility 100 including a set of at least two facility devices 102, such as a user workstation facility device 104; a beam monitor facility device 106; a neutron instrument device 108; a neutron chopper facility device 110; a nuclear reactor facility device, a particle accelerator facility device 114; and a network router facility device 116. Respective facility devices 102 also include a clock component 124, and are interconnected with the other facility devices 102 via a data network 118, such as an Ethernet network.

The example method begins at 400 and includes, among at least two facility devices 102 of the particle detector facility 100, identifying 402 one facility device 102 as a grandmaster clock 200. The example method also includes, for respective selected facility devices 102, configuring 404 the selected facility device 102 to synchronize 406 the clock component 124 with the grandmaster clock 200; and upon detecting an event, retrieve 410 from the clock component 124 of the selected facility device 102 an absolute event timestamp 206 that is independent of event times of other facility events 130, and store 412 a record of the facility event 130 and the absolute event timestamp 206 in the data store 134. By configuring the facility devices 102 to interoperate in this manner, the example method enables the facility devices 102 of the particle detector facility 100 to record facility event 130 with absolute timestamps 206 with the desirable properties of tight synchronization with the absolute time of a grandmaster clock 200 and/or a high degree of precision in accordance with the present invention, and so ends at 414.

Embodiments of the techniques presented herein may include a computer-readable storage medium usable to cause a facility device 102 to utilize the techniques presented herein. Such computer-readable storage media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
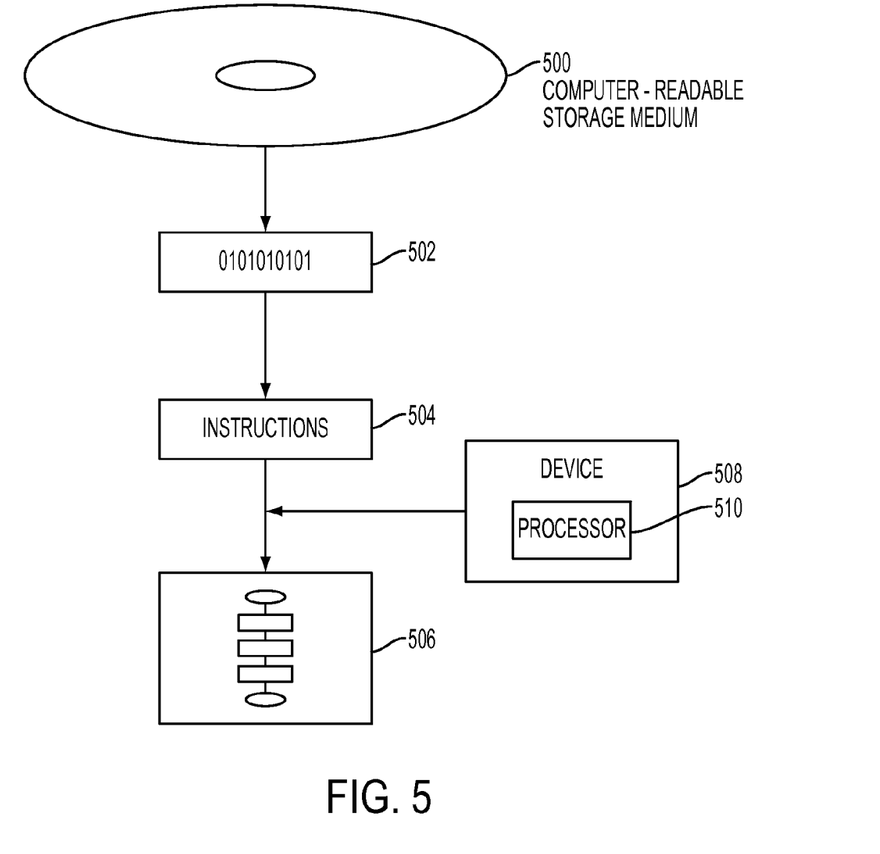
FIG. 5 is schematic illustration of an example computer-readable storage medium usable to configure a set of particle detector facility devices to synchronize a set of clock components over a data network for absolute event time recording in accordance with at least one embodiment of the present invention.

FIG. 5 is an illustration of an embodiment of a computer-readable storage medium, including a computer-readable storage medium 500 (e.g., a CD-R, DVD-R, or a platter of a hard disk drive), on which is encoded computer-readable data 502. This computer-readable data 502 in turn includes a set of computer instructions 504 configured to operate in accordance with the present invention. In one such embodiment, the processor-executable instructions 504 may be configured to, when executed on a processor 510 of a device 508, cause the device 508 to perform a method 506 of configuring facility devices 102 within a particle detector facility 100 to record event times, such as the example method of FIG. 4. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example system of FIG. 3, the example method of FIG. 4, and/or the example computer-readable storage medium of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques may be utilized within many types of particle detector facilities 100, such as cyclotron facilities; synchotron radiation facilities; electron/positron accelerator and/or collider facilities; electron/proton accelerator and/or collider facilities; and hadron accelerator and/or collider facilities. The particle detector facility 100 may be a set of devices and/or instruments interoperating together within a building; the entire building containing the devices and/or instruments; and/or a collection of over two or more buildings, which may be grouped together and/or geographically distant. Time synchronization may be performed among the facility devices of the at least two buildings that together comprise the particle detector facility (e.g., connected by a data and clock synchronization network).

As a second variation of this first aspect, the techniques may be utilized to configure the event time recording of many types of facility devices 102 operating within such particle facilities. Such facility devices 102 may include the components of the particle detection apparatus, including beam monitor facility devices 106; neutron instrument devices 108; neutron chopper facility devices 110; nuclear reactor facility devices; and particle accelerator facility devices 114. Such facility devices 102 may also include various types of computing devices, such as user workstation facility devices 104; server facility devices; and portable user computing devices, such as notebook computers, tablets, and phones. Such facility devices 102 may also include facility infrastructure devices, such as network facility devices 102 (e.g., network adapters, routers, switches, hubs, and modems). Such facility devices 102 may also include various types of infrastructure and industrial control components, such as facility supervisory control and data acquisition (SCADA) components that enable the control of power, climate control, water, communication, automation, monitoring, and industrial processes.

As a third variant of this first aspect, the facility data networks 118 may utilize a variety of wired and/or wireless networking technologies, such as Ethernet, Infiniband, Fiber Channel, WiFi, Bluetooth, and cellular communication, and various types of network protocols, such as a variant of the transmission control protocol (TCP), the user datagram protocol (UDP), and/or the internet protocol (IP).

As a fourth variant of this first aspect, the facility data network 118 may be utilized for many other tasks convey in addition to the clock synchronization technique; e.g., the facility network may convey data among devices in a broadcast, multicast, server/client, and/or peer-to-peer model, and/or may also supply power to the facility devices 102, such as a power-over-Ethernet (PoE) network deployment that deploys power to the facility devices 102 through a power over Ethernet channel included in an Ethernet network connection. Respective facility devices 102 may also be connected to the network 208 through separate cabling and/or network adapters for the conveyance of data 120 and clock synchronization, or may use the same cabling and/or network adapter for conveyance of both data 120 and clock synchronization.

As a fifth variation of this first aspect, the facility devices 102 may be configured to record many types of facility events 130 arising within the particle detector facility 100. Such facility events 130 may include, e.g., an experiment initiation event; an experiment completion event; a particle emission event; a particle collision event; and a particle detection event. These and other variations in particle detector facility 100 scenarios may be compatible with the techniques presented herein.

D2. Clock Synchronization

A second aspect that may vary among embodiments of these techniques involves the manner of configuring respective facility devices 102 to synchronize with the grandmaster clock 200.

As a first variation of this second aspect, the grandmaster clock 200 may be identified in many ways. As a first such example, a facility device 102 may be initially installed as a grandmaster clock 200, such as a dedicated facility device 102 featuring a high-precision atomic clock. As a second such example, a facility device 102 may be designated as a grandmaster clock 200 among a current set of facility devices 102 by an administrator. As a third such example, a facility device 102 may be nominated and/or selected as a grandmaster clock 200 through an automated selection process (e.g., according to processing load, network capacity, and/or achievable time synchronization precision with the other facility devices 102).

In some scenarios, the designation of a grandmaster clock 200 may change; e.g., upon failure of a first facility device 102 operating as a grandmaster clock 200 or the identification of a different facility device 102 that is capable of achieving higher performance in the role of a grandmaster clock 200, a second facility device 102 may be identified as the grandmaster clock 200.

As a second variation of this second aspect, the grandmaster clock 200 may communicate with the respective other facility devices 102 through many types of networks. As a first such example, the grandmaster clock 200 may communicate with the other devices though an Ethernet network connection according to a transmission control protocol (TCP) in order to synchronize the clock components 124 of the selected facility devices 102 with the grandmaster clock 200. As a second such example, the grandmaster clock 200 and other facility devices 102 may utilize a variety of time synchronization techniques, such as a variant of a precision time protocol (PTP) synchronization technique 202, to synchronize the clock component 124 of the selected facility device 102 with the grandmaster clock 200.

As a third variation of this second aspect, the other facility devices 102 may synchronize with the grandmaster clock 200 in a variety of ways. As a first such example, all of the facility devices 102 may synchronize directly with the grandmaster clock 200. Alternatively, at least one facility device 102 may be designated as a master clock that synchronizes directly with the grandmaster clock 200, and at least one other facility device 102 may synchronize with the master clock instead of with the grandmaster clock 200. When the master clock receives a request from another facility device 102 to perform a time synchronization, the master clock may synchronize the clock component 124 of the master clock with the clock component 124 of the other facility device 102.

Additionally, in an embodiment of the invention, at least two facility devices of the particle detector facility are identified as master clocks, and are respectively associated with one or more other facility devices; and for each selected facility device that is neither a grandmaster clock nor a master clock, the clock synchronization may therefore be performed by synchronizing the clock component with the master clock that is associated with the selected facility device. A hierarchy of time synchronization may therefore be established to distribute the computational load of the time synchronization system over the set of facility devices 102.

As a fourth variation of this second aspect, the facility devices 102 may perform the time synchronization at predefined times (e.g., at a fixed time frequency). Such predefined times may also be different for different facility devices 102; e.g., the grandmaster clock 200 may synchronize or verify its clock time with an ultra-reliable time source at a first time, and may synchronize with each of a set of master clocks (in series or in parallel) at a second time, which may in turn synchronize with other facility devices 102 (in series or in parallel) at a third time. Alternatively, the facility devices 102 may perform the time synchronization and/or resynchronization in relation to various facility events 130 (e.g., before beginning an experiment, or upon detecting a deviance of the clock component 124 and at least one other clock component 124 of at least one other facility device).

As a fifth variation of this second aspect, the facility devices 102 may record various additional types of information in the data store 134 along with an event and an absolute event timestamp 206. As a first such example, a facility device 102 may record information about the precision and accuracy of the absolute event timestamp 206, such as the last time that the facility device 102 synchronized with the grandmaster clock 200. As a second such example, in addition to recording the incidence of a facility event 130, a facility device 102 may detect at least one event property of the facility event 130, and record the event property in the record of the facility event 130 and the absolute event timestamp 206 in the data store 134 (e.g., various forms of data describing the event).

Figure 6:
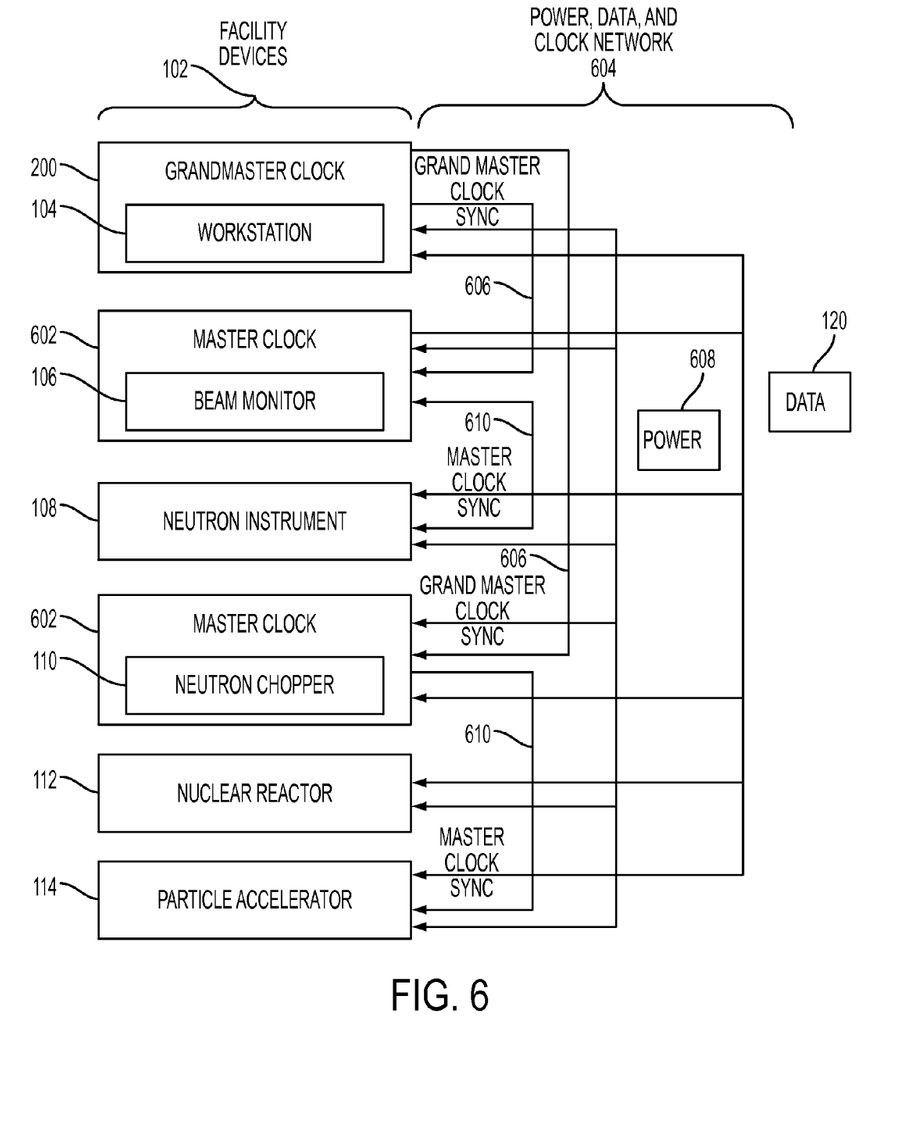
FIG. 6 is a schematic illustration of an example set of particle detector facility devices configured to synchronize a set of clock components over a data network for absolute event time recording in accordance with at least one embodiment of the present invention.

FIG. 6 presents an illustration of an example scenario featuring several variations of the techniques presented herein. In this example scenario, a set of facility devices 102 within a particle detector facility 100 is connected through a power, data, and clock network 604 that provides time synchronization in addition to data 120 and power 608 distribution, such as a power-over-Ethernet (PoE) channel. Among the facility devices 102, a first facility device 102 (e.g., a workstation) is designated as a grandmaster clock 200, and two other facility devices 102 (e.g., a neutron chopper and a beam monitor) are designated as master clocks 602. The grandmaster clock 200 performs a grandmaster clock-master clock time synchronization 606 with the master clocks 602, and the master clocks 602, in turn, perform a master clock-facility device time synchronization 610 with other facility devices 102 (e.g., a neutron instrument and a particle accelerator). In this manner, the facility devices 102 are configured to achieve time synchronization using a general data, power, and clock network 604 in a distributed manner in accordance with the techniques presented herein.

E. Use of Terms

Embodiments or examples, illustrated in the drawings, are disclosed below using specific language. These examples are provided to disclose the invention, including the best mode, and also to enable any person skilled in the art to practice the invention, including making and using any devices or systems and performing any incorporated methods. The embodiments or examples are not intended to be limiting. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Any alterations and modifications in the disclosed embodiments, and any further applications of the principles disclosed in this document are contemplated as would normally occur to one of ordinary skill in the pertinent art.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A system for configuring a particle detector facility to record event times, the system comprising:

a grandmaster clock designating component comprising instructions that, when executed on a processor of at least one selected facility device of a facility device set of the particle detector facility, wherein the selected facility device is selected from a facility device type set comprising:
   a beam monitor facility device,
   a neutron instrument facility device,
   a neutron chopper facility device,
   a nuclear reactor facility device,
   a particle accelerator facility device,
   a network router facility device, and
   a user workstation facility device,
cause the at least one selected facility device to identify one facility device of the particle facility as a grandmaster clock; and
a clock synchronizing component comprising instructions that, when executed on the processor of the selected facility device further comprising a clock component and a local data store of the selected facility device, cause the selected facility device to:
synchronize the clock component with the grandmaster clock; and
upon detecting an event:
   retrieve from the clock component of the selected facility device an absolute event timestamp that is independent of event times of other events; and
   store a record of the event and the absolute event timestamp in the local data store.

2. The system of claim 1, wherein the event arising within the particle detector facility is selected from an event set comprising:
   an experiment initiation event;
   an experiment completion event;
   a particle emission event;
   a particle collision event; and
   a particle detection event.

3. The system of claim 1, synchronizing with the grandmaster clock further comprising: synchronizing the clock component of the selected facility device with the clock component of the grandmaster clock according to a precision time protocol (PTP) synchronization technique.

4. The system of claim 1, wherein:
at least one facility device comprising a master clock is further configured to synchronize a clock component of the master clock with the grandmaster clock; and
synchronizing with the grandmaster clock further comprises: synchronizing the clock component of the selected facility device with the clock component of the master clock.

5. The system of claim 1, wherein:
the selected facility device further comprises a master clock; and
the instructions of the clock synchronizing component are further configured to, upon receiving, from a second facility device of the particle detector facility, a request to synchronize a second clock component of the second facility device with the clock component of the master clock, synchronize the clock component of the master clock with the second clock component of the second facility device.

6. The system of claim 1, wherein the instructions of the clock synchronizing component are further configured to, upon detecting a divergence of the clock component and at least one other clock component of at least one other facility device, resynchronize the clock component of the selected facility device with the grandmaster clock.

7. The system of claim 6, wherein the instructions of the clock synchronizing component are further configured to, after resynchronizing the clock component of the selected facility device with the grandmaster clock, resynchronize the clock component of the selected facility device with a second clock component of a second facility device of the particle detector facility.

8. A method of configuring a particle detector facility to record event times, the method comprising:
among at least two facility devices of a facility device set of the particle detector facility, the respective facility devices selected from a facility device type set comprising:
a beam monitor facility device,
a neutron instrument facility device,
a neutron chopper facility device,
a nuclear reactor facility device,
a particle accelerator facility device,
a network router facility device, and
a user workstation facility device,
identifying one facility device as a grandmaster clock; and
for respective selected facility devices that comprise a clock component and a local data store of the selected facility device, configuring the selected facility device to:
synchronize the clock component with the grandmaster clock; and
upon detecting an event:
retrieve from the clock component of the selected facility device an absolute event timestamp that is independent of event times of other events; and
store a record of the event and the absolute event timestamp in the local data store.

9. The method of claim 8, wherein the event arising within the particle detector facility is selected from an event set comprising:
an experiment initiation event;
an experiment completion event;
a particle emission event;
a particle collision event; and
a particle detection event.

10. The method of claim 8, wherein:
respective selected devices further comprise an Ethernet network connection; and
synchronizing with the grandmaster clock further comprises: communicating with the grandmaster clock through the Ethernet network connection according to a transmission control protocol (TCP) to synchronize the clock component of the selected facility device with the grandmaster clock.

11. The method of claim 8, wherein:
the Ethernet network connection further comprises a power over Ethernet (PoE) channel; and
the selected facility device further comprises at least one device component configured to receive power from the power over Ethernet channel of the Ethernet network connection.

12. The method of claim 8, synchronizing the clock component of the selected facility device with the clock component of the grandmaster clock further comprising: synchronizing the clock component of the selected facility device with the grandmaster clock according to a precision time protocol (PIP) synchronization technique.

13. The method of claim 8, wherein:
at least one selected facility device further comprises a master clock having a second clock component and configured to synchronize the second clock component of the master clock with the grandmaster clock; and
synchronizing the clock components of at least one selected facility device further comprises: synchronizing the clock component of the selected facility device with the second clock component of the master clock.

14. The method of claim 13, wherein:
at least two facility devices of the particle detector facility are identified as master clock respectively associated with at least one other facility device; and
synchronizing the clock component of the selected facility device further comprises: synchronizing the clock component of the selected facility device with the second clock component of a selected master clock that is associated with the selected facility device.

15. The method of claim 8, further comprising: configuring at least one selected facility device to, upon detecting a deviance of the clock component of the selected facility device and a second clock component of at least one other facility device, communicate with the grandmaster clock to resynchronize the clock component of the selected facility device with the grandmaster clock.

16. The method of claim 8, further comprising: after resynchronizing the clock component of the selected facility device with the grandmaster clock, resynchronize the clock component with the second clock component of the other facility device.

17. The method of claim 8, further comprising: configuring at least one selected facility device to:
detect at least one event property of the event; and
record the event property with the event and the absolute event timestamp in the record of the local data store.

18. A sensor device of a particle detector facility, wherein the device set further comprises, the sensor device comprising:
a sensor that detects a particle event arising within the particle detector facility;
a local clock;
a local storage device;
a processor; and
a memory storing instructions that, when executed by the processor, cause the sensor device to:
identify the remote clock of the remote device of the particle facility as a grandmaster clock;
synchronize the clock component with a grandmaster clock of the particle facility; and
upon the sensor detecting an instance of the particle event:
retrieve, from the local clock, an absolute event timestamp that is independent of event times of other events; and
store, in the local storage device, a record of the event and the absolute event timestamp retrieved from the local clock.

19. The system of claim 1, wherein identifying one facility device of the particle facility as the grandmaster clock further comprises:
interoperating with at least one remote device of the facility device set to identify an automated consensus indicating a selection of a selected device of the facility device set to be identified as the grandmaster clock.

20. The system of claim 1, wherein storing the record of the absolute event timestamp in the local data store further comprises: storing; in the record, additional information about the absolute event timestamp that comprises at least one of:
a precision of the absolute event timestamp; and an accuracy of the absolute event timestamp with respect to the grandmaster clock.

* * * * *

UNITED STATES PATENT AND TRADEMARK OFFICE
CERTIFICATE OF CORRECTION

PATENT NO. : 9,541,947 B2  
APPLICATION NO. : 13/960832  
DATED : January 10, 2017  
INVENTOR(S) : Yichin Yen et al.

Page 1 of 1

It is certified that error appears in the above-identified patent and that said Letters Patent is hereby corrected as shown below:

In the Claims

Column 13, Line 64, please delete "(PIP)" and insert therefor --(PTP)--.

Signed and Sealed this  
Second Day of May, 2017

Michelle K. Lee  
*Director of the United States Patent and Trademark Office*